United States Patent
Flippo

(10) Patent No.: US 6,588,568 B1
(45) Date of Patent: Jul. 8, 2003

(54) MULTIPLE-WHEEL AXLE SUPPORT

(75) Inventor: Bobby K. Flippo, Jonesboro, AR (US)

(73) Assignee: Northstar Industries, Inc., Jonesboro, AR (US)

( * ) Notice: Subject to any disclaimer, the term of this patent is extended or adjusted under 35 U.S.C. 154(b) by 0 days.

(21) Appl. No.: 10/096,130

(22) Filed: Mar. 6, 2002

(51) Int. Cl.$^7$ .............................................. B65G 13/00
(52) U.S. Cl. ................................................. 193/35 TE
(58) Field of Search ..................... 193/35 TE; 198/588, 198/594, 812

(56) References Cited

U.S. PATENT DOCUMENTS

| | | |
|---|---|---|
| 2,678,125 A | 5/1954 | Bonney, Jr. |
| 3,276,558 A | * 10/1966 | Guske et al. ............ 193/35 TE |
| 4,266,650 A | * 5/1981 | Patel et al. ............. 193/35 TE |
| 4,852,712 A | 8/1989 | Best |
| 5,147,025 A | 9/1992 | Flippo |
| 5,224,584 A | 7/1993 | Best et al. |
| 5,456,348 A | 10/1995 | Whetsel et al. |
| 5,595,283 A | 1/1997 | Whetsel |
| 5,632,371 A | 5/1997 | Best et al. |
| 5,636,728 A | 6/1997 | Best et al. |
| 5,718,325 A | 2/1998 | Doster et al. |

OTHER PUBLICATIONS

Conveyor Price List published by Nestaflex Conveyors.
Best, Your Fluid Loading and Unloading Experts (catalog).

* cited by examiner

*Primary Examiner*—James R. Bidwell
(74) *Attorney, Agent, or Firm*—Kilpatrick Stockton LLP

(57) ABSTRACT

An improved support multiple-wheel axle providing intermittent ensleevement of the axle between the wheels, plus a lower yoke assuring the vertical orientation of the axle support by assuring that movement of the lower portion of the axle support mirrors movement of the axle and axle ensleevement, thereby maintaining optimal load bearing.

21 Claims, 5 Drawing Sheets

MULTIPLE-WHEEL AXLE SUPPORT

(B) CROSS REFERENCES TO RELATED APPLICATIONS

Not applicable.

(C) FEDERALLY SPONSORED RESEARCH OR DEVELOPMENT

Not applicable.

(D) MICROFICHE APPENDIX

Not applicable.

(E) BACKGROUND OF THE INVENTION

(1) Field of the Invention

The present invention generally relates to the field of flexible expandable roller conveyors which utilize "lazy tong" support frames or structures. More particularly, this invention improves upon those conveyors having a plurality of rollers or wheels rotatably impaled upon an axle spanning between two lazy tong lines.

(2) Description of the Related Art Including Information Disclosed Under 37 C.F.R. 1.97 and 1.98

Know in the art are various conveyor systems having expandible flexible systems of rollers or wheels. Typical features include: 1. a plurality of usually parallel horizontal axles, each containing one or more rollers or wheels rotatably impaled thereon; and 2., supporting said axles, a frame system with two parallel lines of scissoring X-shaped pairs of trusses. Each such pair of trusses along each line is pivotally connected at a center point to allow scissoring; moreover, each such scissor-pair along each line (except perhaps at each terminal) is typically pivotally connected at each end (top or bottom) to the corresponding end of an adjacent scissor-pair, thereby forming a chain or line capable of expansion (or contraction) lengthwise by the lengthening (or narrowing) of the distance between the upper ends and lower ends of each scissor-pair apart (or together) in a manner resembling the opening (or closing) of a pair of scissors. Each opposite end of each axle is typically connected to (and supported by) the upper end of at least one (and usually two) scissor-pair, and each axle spans both parallel lazy tong lines.

Each known conveyor system includes additional means of supporting each axle spanning between the lazy tong frame. One known system includes an axle brace member (parallel and below an axle) spanning the outer lazy tong lines. Typically, such an axle brace is essentially a partially inverted U-shaped channel mounted at each end to the upper portion of a scissor-pair truss. In one version wherein each axle impales a plurality of wheels (such as disclosed in U.S. Pat. No. 4,852,712 discussed below), at periodic positions between each wheel (above), the uppermost face of the U-channel includes a plurality of roller support brackets extending upward to the axle, and having a terminal aperture through with the axle is inserted during installation of the wheels. Another known conveyor system (such as depicted on the cover of the Conveyor Price List published by Nestaflex Conveyors, noted below) adds intermediate support to each axle by including additional lazy tong lines between the two outer lazy tong lines. These systems typically have the axle brace attached to a bolt or rod at the center point of a scissor-pair.

For various reasons, impact loading of heavy items causes certain load-bearing parts of the known conveyor systems to buckle, bend, twist or otherwise fail. Under stress, the axle brace may twist or torque, the support bracket may bend or break, the axle may bend, the connection to support legs may be compromised, or any number of similar failures have been known to occur.

The following patents are arguably related to the patentability of the subject invention:

| U.S. Pat. | 1st Inventor | Date |
|---|---|---|
| 5,718,325 | Doster, et al. | Feb. 17, 1998 |
| 5,636,728 | Best, et al. | Jun. 10, 1997 |
| 5,632,371 | Best, et al. | May 27, 1997 |
| 5,595.283 | Whetsel | Jan. 21, 1997 |
| 5,456.348 | Whetsel, et al. | Oct. 10, 1995 |
| 5,224,584 | Best, et al. | Jul. 6, 1993 |
| 5,147,025 | Flippo | Sep. 15, 1992 |
| 4,852,712 | Best | Aug. 1, 1989 |
| 3.276.558 | Guske, et al. | Oct. 4, 1966 |
| 2,678,125 | Bonney. Jr. | May 11, 1954 |

U.S. Pat. No. 4,852,712 issued to Best discloses a conveyor comprising a lazy tong frame system including an outer pair of parallel lazy tong lines and a plurality of multiple-wheeled axles spanning both lazy tong lines, said system supported by a pair of extension legs at both ends. An axle brace (48) spans both lazy tong lines below an associated axle, each end of each axle brace fastened to a scissor-pair truss above the middle pivotal connection of the scissor-pair, so that the vertical orientation of the axle brace varies with the angular positioning of said scissor-pair trusses. Each axle brace includes a plurality of roller support brackets impaled by the axle between adjacent wheels.

U.S. Pat. No. 5,632,371 issued to Best et al. (including the Applicant herein) discloses pairs of vertical bars (42), each bar supporting the end of an axle carrying an elongated roller. An upper portion of each vertical bar is pivotally connected to the adjoining upper ends of adjacent scissor-pairs of a lazy tong line; the top terminus of said vertical bar includes an open-ended upstanding cradle-slot for accepting (in releasable fashion) the terminus of the axle impaling the elongated roller. The primary function of each vertical bar is to provide quick-release attachment of the roller, for quicker maintenance without affecting the connections of adjoining scissor-pairs. The bottom portion of said vertical bar may include an elongated slot, which is impaled (in slidable fashion) by the pin or span-end connecting the adjoining lower ends of said scissor-pairs. Although the upper portion of each vertical bar provides the functional attachment of the axle to lazy tong lines, and thereby provides terminal support for each elongated roller, the lower portion of each vertical bar does not lend strength to the intermediate portion of the axle above (between both terminal ends of the elongated roller); the lower connection occurs only at each point of contact with scissor-pairs of the lazy tong line, so that no support is provided in the middle of the rollers where most of the impact occurs. The slidable lower connection of each vertical bar described in said patent functions to govern expansion and contraction of both lines of the lazy tong frame, which is crucial to prevent malfunctioning of this motorized conveyor; all of the motors mounted coaxial to the middle connection points of the scissor-pairs must constantly maintain the proper distance from the roller axles, to provide the necessary tautness to the pulley belts (between the motor axle and the roller axles) to rotate the rollers. (Column 5, lines 38 to 48.) Even more important, expansion of the lazy tong lines should be limited to assure that at least two motorized axles of rollers are beneath the bottom of the smallest box expected to be conveyed on the conveyor; otherwise, the leading edge of a box traveling along the conveyor may dip into the space between the motorized rollers, and thereby jam the conveyor line (and possibly damage merchandise within the box).

U.S. Pat. No. 5,636,728 issued to Best et al. discloses scissor bars connected to allow expansion or contraction, yet provide vertical support for rollers; perpendicular retaining bars (22) are connected in a sliding relationship to an upper and lower scissor bar connection. These vertical retaining bars support elongated horizontal rollers. However, the lower connection occurs only at each point of contact with a lazy tong structure, so that no support is provided in the middle of the conveyor system where most of the impact occurs.

U.S. Pat. No. 5,224,584 issued to Best et al. (including the Applicant herein) discloses side rollers supported by a brace oriented generally vertically and connected to the top and bottom pivotal connections of a lazy tong line; the bottom portion of the brace contains a slot which receives (in sliding fashion) the fastener that forms the portion of the bottom pivotal connection to the lazy tong line. However, the lower connection occurs only at each point of contact with a lazy tong line, so that no support is provided in the middle of the conveyor system where most of the impact occurs. Moreover, the function of this brace is to hold the side roller in place, and prevent lateral movement thereof rather than providing (or augmenting) the vertical support of the middle portions of the elongated horizontal rollers.

The following publications are arguably related to the patentability of the present invention:

1. Conveyor Price List published by Nestaflex Conveyors.
2. Best, Your Fluid Loading and Unloading Experts (catalog).

(F) BRIEF SUMMARY OF THE INVENTION

The most basic version of the invention disclosed herein is an improved manner of maintaining axle support in an essentially vertical orientation, for optimum load bearing. Ensleeving an axle and extending almost snugly against each wheel hub thereon, there is an axle support having wheel-well cutouts; the axle support is essentially suspended from the ensleeved axle, and extends vertically downward. The axle support terminates in a lower yoke portion through which traverses a lower span (such as a rod connected at each end to a lower end of a scissor-pair on separate lazy tong lines). The axle support may also have a stiffening region (such as, for example, a horizontal V-shaped crease in the span's planar surface, paralleling the axle), between the yoke portion and the lower end of the wheel-well cutouts. The yoke portion functions primarily to maintain the vertical orientation of the support plane, in optimal load-bearing orientation.

One primary object of the present invention is to provide axle support maintained vertically in optimal load bearing orientation.

Another primary object of the present invention is to provide intermittent intermediate axle support to multiple-wheel axles, between said wheels, maintained vertically in optimal load bearing orientation.

Another object of the invention is to provide axle support having rugged unitary construction.

Another object of the invention is to provide axle support that is relatively easy to manufacture. Another object of the invention is to provide axle support that is relatively inexpensive to manufacture.

Another object of the invention is to provide axle support that is relatively easy to install.

Other objects will be apparent from a reading of the written description disclosed herein, together with the claims.

(G) BRIEF DESCRIPTION OF THE SEVERAL VIEWS OF THE DRAWINGS

FIG. 1 depicts a perspective view of an improved axle support as described herein; noticeable are the rolled marginal edges (11) of the intermittent intermediate ensleevement, the wheel-well cutouts (12) with side walls formed by separate downward extensions (13) of the axle support ensleevement, and lower wall formed by merger of separate downward extension into a unitary upper plane area (14). Also noticeable are a crease (15) in a stiffening region, and vertical slots (16) and slot separations (17) in a lower yoke region.

Figure 1:
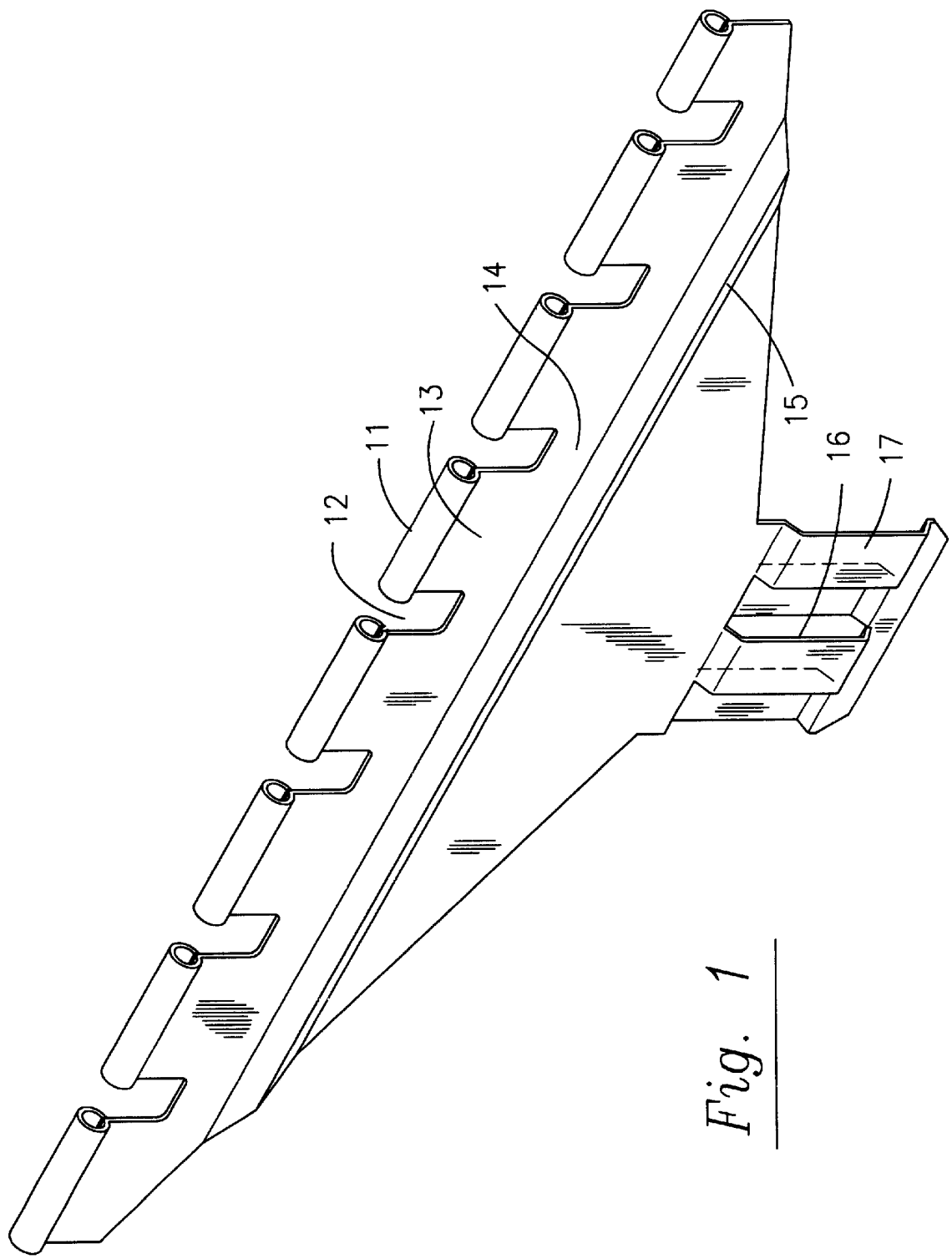
Figure 2:
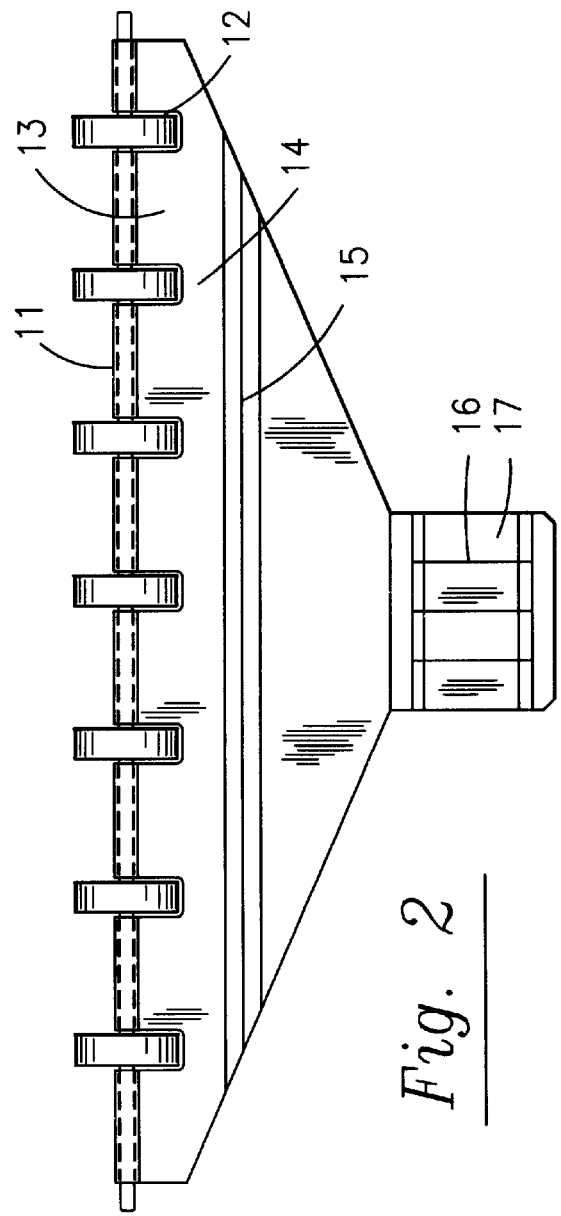
FIG. 2 depicts a "front" elevational view of the axle support of FIG. 1, with wheels within wheel-well cutouts (impaled upon an axle).
Figure 3:
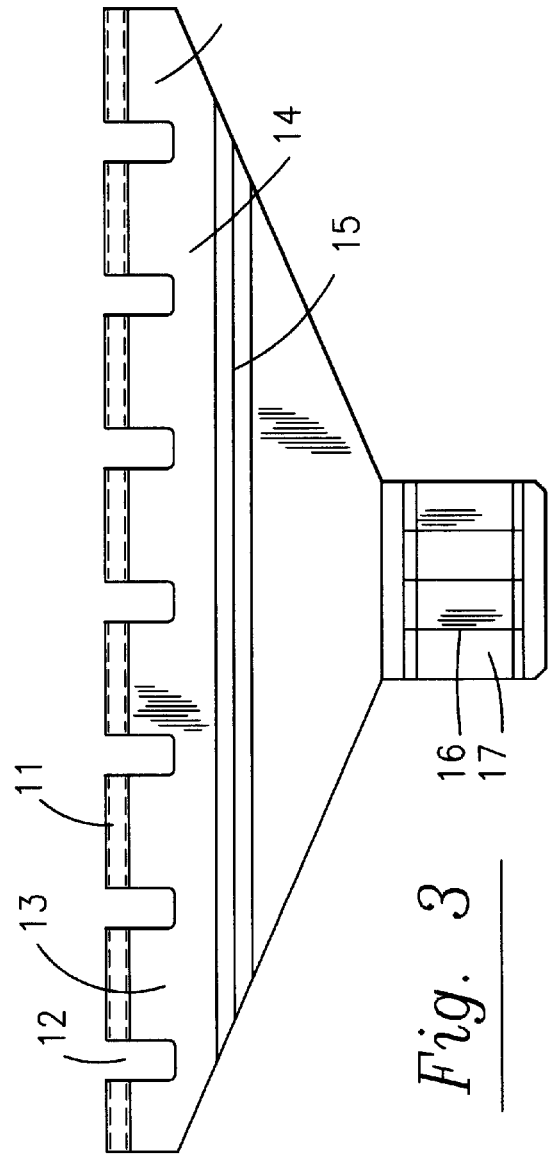
FIG. 3 depicts a "back" elevational view of the axle support of FIG. 1.
Figure 4:
FIG. 4 depicts a side elevational view of the axle support of FIG. 1.
Figure 5:
FIG. 5 depicts top plan view of the axle support of FIG. 3.
Figure 6:
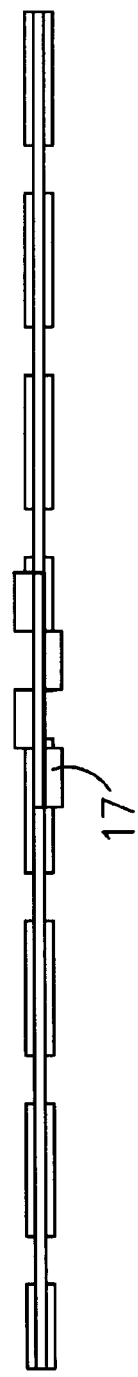
FIG. 6 depicts a bottom plan view of the axle support of FIG. 3.
Figure 7:
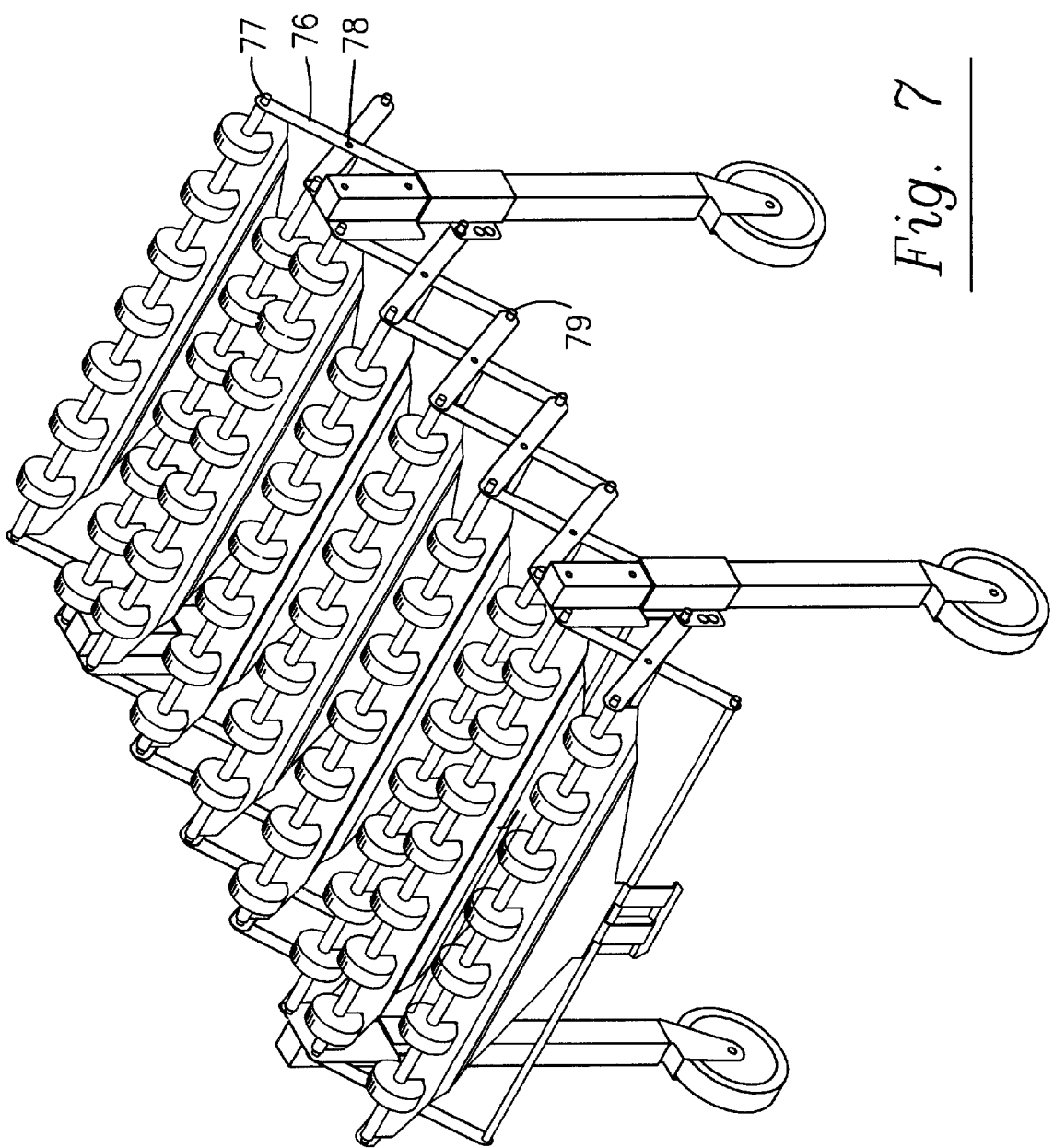
FIG. 7 depicts a perspective view of a plurality of axle supports of FIG. 1, assembled with corresponding scissor-pairs of separate lazy tong lines including pairs of scissor-pair trusses (76), axle connection to upper end (77), pivotal connection to middle (78), and rod connection to lower end (79).
Figure 8:
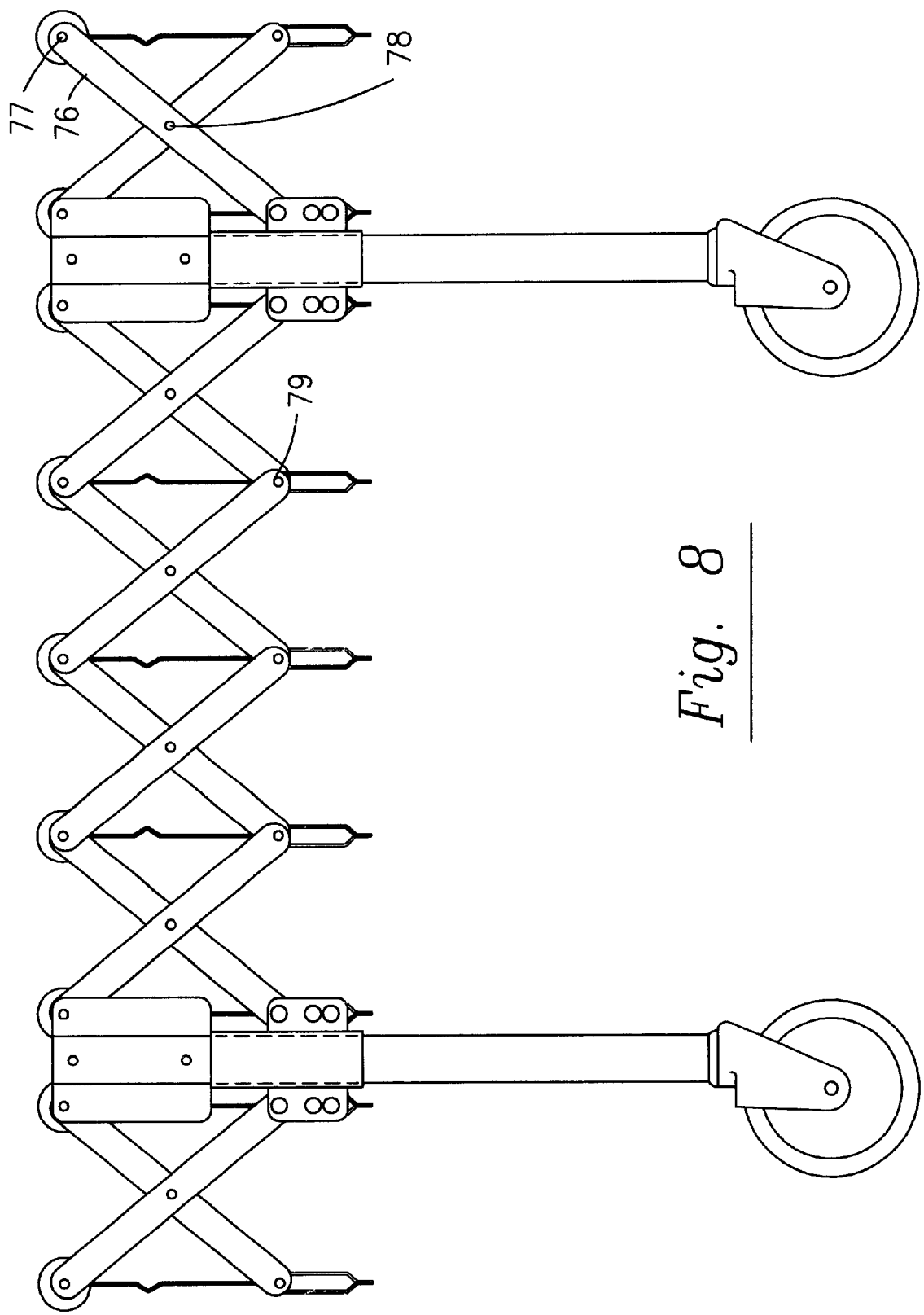
FIG. 8 depicts a side elevational view of the axle supports of FIG. 7.

These drawings illustrate certain details of certain embodiments. However, the invention disclosed herein is not limited to only the embodiments so illustrated. The invention disclosed herein may have equally effective or legally equivalent embodiments.

(H) DETAILED DESCRIPTION OF THE INVENTION

For the sake of simplicity and to give the claims of this patent application the broadest interpretation and construction possible, the following definitions will apply:

1. The word "ensleeve" or derivative thereof means to essentially encircle the axle, relatively snugly yet without impeding the axle's function of carrying a plurality of rotatable wheels.

2. The word "intermediate" or derivative thereof, in the context of an axle, means essentially the portion between the connections of the axle to lazy tong lines, including conveyor systems having more than two lazy tong lines.

3. The word "intermittent" or derivative thereof means stopping and starting at intervals; for example, wheels may be intermittently located on an axle, or axle support(s) may be intermittently located on an axle between such intermittent wheels.

4. The phrase "lazy tong line" means a single line of scissor-pairs, adjacent scissor-pairs joined top-end to top-end and bottom-end to bottom-end.

5. The phrase "lazy tong frame" means at least two essentially parallel lazy tong lines, each such lazy tong line connected to and supporting the end of a plurality of usually parallel horizontal axles.

Also for the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural or functional requirements. For example, any material may be used so long as it satisfies the function for which it is being used, such as imparting rigidity to the invention. Such materials may include any of the following, or possibly combinations thereof: steel, aluminum, titanium, iron, plastic, polymer, fiberglass, and wood.

Although the invention has a number of features and variations, its most general form includes (comprises) an ensleeving cylinder with intermittent wheel-wells, below which is situated a yoke encapturing a lower span connecting corresponding lower ends of scissor-pairs of separate lazy tong lines, directly beneath their corresponding upper ends.

The present invention includes an improvement providing support, preferably intermittently between the wheels of a multiple wheel axle spanning an expandable flexible conveyor system, said system typically comprising at least two essentially parallel lines of lazy tong scissor-pairs, adjacent scissor-pairs pivotally connected at their upper ends and lower ends, a plurality of corresponding pairs of connected lower ends of both lazy tong lines each connected by a horizontal lower span, a plurality of corresponding pairs of connected upper ends of both lazy tong lines each supporting a horizontal axle spanning therebetween, each axle containing a plurality of wheels or rollers rotatably impaled thereon. The improvement includes an essentially rigid axle support essentially intermittently ensleeving the axle between the wheels and extending vertically downward therefrom, said axle support further comprising a lower portion maintaining a cooperative relationship with the lower scissor-pair ends directly beneath the axle.

The lower portion may include a lower yoke portion, and the cooperative relationship may include a yoking relationship with the lower yoke portion through which traverses the lower span connected at each end to the lower scissor-pair ends directly beneath the axle.

The downward extension of said intermittent axle ensleevement may include essentially planar material between the wheels, separate (from counterpart material between adjacent wheels) and at least slightly longer than the radii of any adjacent wheels. The planar material may define side walls of intermittent wheel-wells for the wheels impaled on an axle portion unsupported by intermittent axle support. The separate intermittent downward extensions may unify (or merge) into an upper unitary plane, and define a lower wall of the wheel-wells.

Since the wheels of one axle are often staggered with the wheels of an adjacent axle, such staggering may be accomplished by having the side of the axle support acting as the "front" be reversed for the axle support used on the adjacent axle. There is no absolute "front" and "back" sides of the axle support, but reversing the sides on adjacent axle supports may accomplish the desired staggering of wheels.

The lower yoke portion may include at least two separated parallel vertical slots through said planar surface; the separate portion between each pair of slots may be pushed off-plane, and define a vertically elongated aperture sized to slidably accept the lower span directly beneath the axle. In one particular version of the invention, the lower yoke portion consists of at least 4 separated vertical slots, wherein the slots are in the range of between about 1 inch long and about 6 inches long. There is no requirement that all of the slots have the same upper termination point, or otherwise be of the same dimensions. One preferred embodiment has slots that are about 3½ inches long.

The slot separations may be in the range of between about ½ inches wide and about 6 inches wide. One preferred embodiment has slot separations that are about 1½ inches wide. One of the slot separations may be off-plane in a direction opposite from another of the slot separations, so that the elongated aperture essentially centers the lower span in the cross-sectional center of the invention, while the intermittent axle ensleevement centers the axle in the cross-sectional center of the invention directly above the lower span.

In another preferred embodiment of the invention, the slots and slot separations occupy the mid-width portion of a lowermost intermediate portion of the planar surface, having a width narrower than the width of the stiffening region (and intermittent axle support above).

The yoking of the present invention is not limited to the embodiments described above. Yoking my occur through any mechanism capable of assuring that movement of the lower portion of the axle support mirrors movement of the axle and axle ensleevement, so that the axle support maintains its vertical orientation. Other means of yoking may include fastening a vertically elongated eyelet at the proper position on the lower portion of the axle support.

Another version of the invention includes a means of stiffening the axle support beneath the intermittent axle ensleevement. The invention may include at least one stiffening region between said yoke portion and said upper unitary plane. The manner of stiffening may be any manner accomplishing the function of preventing the unitary plane from bowing or otherwise causing the invention to depart substantially from its vertical positioning directly beneath the axle. In one version, the stiffening region includes a crease near said upper unitary plane, essentially extending horizontally across said plane the entire width of the intermittent axle support. The crease may be accomplished by essentially pushing said plane off-plane along one leading point; such a crease may essentially resemble a sideways V-shaped deformation essentially extending horizontally across said plane. Alternatively, there may be a plurality of such creases extending horizontally or diagonally across said plane; and some such creases may be off-plane in a direction opposite from other such creases. Another alternative may be to fasten at least one rigid bar horizontally across said plane, or design the axle support to incorporate such cross-sectional thickening into the final dimensions of the design.

One specific version of the invention includes an expandable flexible conveyor system improvement as described above, including an intermittent axle ensleevement essentially ensleeving the axle between the wheels. There is also included an essentially planar downward extension of said intermittent axle ensleevement beside each of the wheels, each extending downward at least further than the radii of any adjacent wheel and thereby defining side walls of intermittent wheel-wells for the wheels impaled on an axle portion unsupported by intermittent axle support. The separate downward extensions merge or unify into an upper unitary plane, and define a lower wall of the wheel-wells. The plane further includes an off-plane crease essentially extending horizontally across said plane, for stiffening the plane. Near the bottom of the invention there are at least three separated lower vertical slots in said planar surface; alternate separate portions between each pair of slots are situated off-plane in a direction opposite from the other separate portion(s), and define a vertically elongated aperture sized to slidably accept the lower span directly beneath the axle. One preferred construction material is 16 gauge steel. Cold roll steel is known to work well.

More particularly, said intermittent axle ensleevement may include an essentially cylindrically rolled or curled margin of said planar material beside said wheels, said intermittent axle ensleevement having a diameter slightly greater than that of the axle. All of said ensleevements between the wheels combining with the width of the wheels yield an aggregate width of about 23.185 inches, although the aggregate width of the axle support ensleevement is limited only by the length of the axle. A range of between about 12 inches to about 48 inches is definitely within the purview of this invention, although the length of the axle is the truly limiting factor.

Each downward extension between the wheels may extend separately about 1 inch below said intermittent axle ensleevement, and extend horizontally beside a wheel about 3.1 inches. However, said intermittent downward extensions may range in length on any side from about 1 inch to about 6 inches, depending upon the radii of the wheels and their separation. The unitary plane may extend downwardly at least about 2 inches, and the crease situated therein, extend downwardly for the next approximately 2½ inches, tapering to a width of about 4 inches.

The three separated lower vertical slots may be about 3½ long, and the slot separations may be about 1½ inches wide. Each alternating slot separation may be situated off-plane in a direction opposite from an adjacent slot separation.

In one prototype, the axle support is formed from a single sheet of steel plating having a width spanning essentially the entire length of the axle between the axle's connections to corresponding scissor-pairs on parallel lazy tong lines. The top margin of the axle support is rolled or curled to form an ensleeving cylinder having a diameter slightly greater than that of the axle, with the remainder of the sheet of plating essentially hanging directly beneath the axle. There are periodic wheel-wells cut through the cylinder and adjacent planar portion below, leaving little clearance between the wheel hub and the ensleeving cylinder (and suitable clearance between the outer circumference of the wheel and the adjacent planar portion) after the axle is threaded through the ensleeving cylinder portion and through each wheel positioned in each wheel-well cut-out. Below the end of the periodic wheel-wells, there is a V-shaped horizontal crease in the span support, essentially the entire width of the plane. Below that stiffening feature, the lowermost portion of the span support includes at least two slots cut vertically through the planar surface, the intermediate portion between each pair of slot-cuts then being pushed off-plane sufficient to (when viewed from the plane's cross section) form at least one vertically elongated aperture readily accessible by the tip of a rod traversing (parallel to the planar surface) from the lower end of the scissor-pair immediately below the axle to the corresponding lower end of the corresponding scissor-pair on the opposite lazy tong line. An intermediate yoke is essentially formed by the elongated aperture(s), through which the rod is threaded en route to final attachment at each end to the lower end of a scissor-pair directly beneath a corresponding upper end of a scissor-pair.

Since a scissor-pair has both an upper end pivotally attached to one end of an axle (threaded through the ensleeving cylinder at the top of the axle support) while its vertically aligned lower end is pivotally attached to a rod (traversing through the yoke on the lower portion of the axle support), movement of the upper half of the scissor-pair (and ensleeving cylinder) is mirrored by corresponding movement of the lower half of the scissor-pair (and lower axle support), thereby assuring that the axle support maintains its vertical orientation for optimal load bearing. Moreover, the ensleeving cylinder prevents bending of the axle between the wheels.

The invention disclosed herein may also include a conveyor system described herein, in combination with any of the improvements described herein.

Aside from the improved conveyor system, and the improvements to the known conveyor systems, the invention disclosed herein includes a method of providing support intermittently between the wheels of a multiple wheel axle spanning an expandable flexible conveyor system, as described herein. Said method includes the steps of:

a. positioning each of the wheels within a wheel-well cutout of an intermittent axle support, with each wheel's axial aperture aligned with that of a cylindrical intermittent axle ensleevement;

b. threading an end of the axle through each aligned intermittent axle support and wheel aperture, and fastening each axle end to the upper end of a respective scissor-pair; and c. threading an end of the lower span through an elongated aperture of a lower portion of said axle support, and fastening each lower span end to the lower end of a respective scissor-pair.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

What is claimed is:

1. An improvement providing support intermittently between the wheels of a multiple wheel axle spanning an expandable flexible conveyor system, said system typically comprising at least two essentially parallel lines of lazy tong scissor-pairs, adjacent scissor-pairs pivotally connected at their upper ends and lower ends, a plurality of corresponding pairs of connected lower ends of both lazy tong lines each connected by a horizontal lower span, a plurality of corresponding pairs of connected upper ends of both lazy tong lines each supporting a horizontal axle spanning therebetween, each axle containing a plurality of wheels or rollers rotatably impaled thereon, said improvement comprising an essentially rigid axle support essentially intermittently ensleeving the axle between the wheels and extending vertically downward therefrom, said axle support further comprising a lower portion maintaining a cooperative relationship with the lower scissor-pair ends directly beneath the axle.

2. An expandable flexible conveyor system improvement as described in claim 1 above, wherein said downward extension of said intermittent axle ensleevement comprises essentially planar material between the wheels, separate at least slightly longer than the radii of any adjacent wheels.

3. An expandable flexible conveyor system improvement as described in claim 2 above, wherein said planar material defines side walls of intermittent wheel-wells for the wheels impaled on an axle portion unsupported by intermittent axle support, said separate downward extensions unifying into an upper unitary plane and defining a lower wall of the wheel-wells.

4. An expandable flexible conveyor system improvement as described in claim 1 above, said lower portion comprising a lower means for yoking said lower portion to the movement of the lower scissor-pairs ends directly beneath the axle.

5. An expandable flexible convey system improvement as described in claim 4 above, said cooperative relationship comprising a yoking relationship with said lower yoke means through which traverses the lower span connected at each end to the lower scissor-pair ends directly beneath the axle.

6. An expandable flexible conveyor system improvement as described in claim 4 above, wherein said lower yoke portion comprises at least two separated vertical slots through said planar surface, the separate portion between each pair of slots situated off-plane and defining a vertically elongated aperture sized to slidably accept the lower span directly beneath the axle.

7. An expandable flexible conveyor system improvement as described in claim 6 above, wherein said lower yoke portion consists of at least three separated vertical slots.

8. An expandable flexible conveyor system improvement as described in claim 6 above, wherein said slots are in the range of between about 1 inch long and about 6 inches long.

9. An expandable flexible conveyor system improvement as described in claim 6 above, wherein said slots are about 3½ inches long.

10. An expandable flexible conveyor system improvement as described in claim 6 above, wherein said slot separations are in the range of between about ½ inch wide and about 6 inches wide.

11. An expandable flexible conveyor system improvement as described in claim 6 above, wherein said slot separations are about 1½ inches wide.

12. An expandable flexible conveyor system improvement as described in claim 6 above, wherein at least one of said slot separations is off-plane in a direction opposite from another of said slots separations.

13. An expandable flexible conveyor system improvement as described in claim 6 above, wherein said slots and slot separations occupy the mid-width portion of a lowermost portion of said planar surface having a width narrower than the width of the stiffening region.

14. An expandable flexible conveyor system improvement as described in claim 1 above, further comprising at least one means for stiffening said upper unitary plane, said means situated in a region between said yoke portion and said upper unitary plane.

15. An expandable flexible conveyor system improvement as described in claim 13 above, wherein said stiffening means comprises a crease near said upper unitary plane, essentially extending horizontally across said plane.

16. An expandable flexible conveyor system improvement as described in claim 14 above, said crease comprising pushing said plane off-plane along one leading point, said crease essentially resembling a sideways V-shaped deformation essentially extending horizontally across said plane.

17. An expandable flexible conveyor system improvement as described in claim 1 above comprising:
   a. an intermittent axle ensleevement essentially ensleeving the axle between the wheels,
   b. an essentially planar downward extension of said intermittent axle ensleevement beside each of the wheels, each extending downward at least further than the radii of any adjacent wheel and thereby defining side walls of intermittent wheel-wells for the wheels impaled on an axle portion unsupported by intermittent axle support, said separate downward extensions unifying into an upper unitary plane and defining a lower wall of the wheel-wells,
   c. said plane further comprising an off-plane crease essentially extending horizontally across said plane, and
   d. at least three separated lower vertical slots in said planar surface, the separate portion between each pair of slots situated off-plane and defining a vertically elongated aperture sized to slidably accept the lower span directly beneath the axle.

18. An expandable flexible conveyor system improvement as described in claim 17 above:
   a. said intermittent axle ensleevement comprising an essentially cylindrically curled margin of said planar material beside said wheels, said intermittent axle ensleevement having a diameter slightly greater than that of the axle, all of said ensleevements between the wheels combining with the width of the wheels to yield an aggregate width in the range of between about 12 inches to about 48,
   b. said downward extension between the wheels extending separately below said intermittent axle ensleevement slightly further than the radii of any adjacent wheels, and extending horizontally beside a wheel in the range of between about 1 inch to about 6 inches until merging into a unitary plane,
   c. said unitary plane extending downwardly at least about 2 inches and creasing therein, then for the next approximately 2½ inches therebelow tapering to a width of about 4 inches,
   d. said three separated lower vertical slots in the range of between about 1 inch to about 6 inches, said slot separations in the range of between about ½ inch to 6 inches wide, each of said slot separations situated off-plane in a direction opposite from an adjacent slot separation.

19. An expandable flexible conveyor system improvement as described in claim 17 above:
   a. all of said ensleevements between the wheels combining with the width of the wheels to yield an aggregate width of about 23.185 inches,
   b. said downward extension between the wheels extending separately about 1 inch below said intermittent axle ensleevement, and extending horizontally beside a wheel about 3.1 inches, and
   c. said three separated lower vertical slots about 3½ inches long, said slot separations about 1½ inches wide.

20. An improved expandable flexible conveyor system, comprising:
   a. at least two essentially parallel lines of lazy tong scissor-pairs, adjacent scissor-pairs pivotally connected at their upper ends and lower ends, a plurality of corresponding pairs of connected lower ends of both lazy tong lines each connected by a horizontal lower span, a plurality of corresponding pairs of connected upper ends of both lazy tong lines each supporting a horizontal axle spanning therebetween, each axle containing a plurality of wheels or rollers rotatably impaled thereon, b. an intermittent axle ensleevement essentially ensleeving each of said axles between said wheels, c. an essentially planar downward extension of said intermittent axle ensleevement between each axle wheel, defining side walls of intermittent wheel-wells for the wheels impaled on an axle portion unsupported by intermittent axle support, said separate downward extensions unifying into an upper unitary plane and defining a lower wall of the wheel-wells, d. said plane further comprising a crease essentially resembling a sideways V-shaped deformation essentially extending horizontally across said plane, and e. at least two separated lower vertical slots in said planar surface, the separated portion between each pair of slots situated off-plane and defining a vertically elongated aperture slidably accepting said lower span directly beneath said axle.

21. A method of providing support intermittently between the wheels of a multiple wheel axle spanning an expandable flexible conveyor system typically comprising at least two essentially parallel lines of lazy tong scissor-pairs, adjacent scissor-pairs pivotally connected at their upper ends and lower ends, a plurality of corresponding pairs of connected lower ends of both lazy tong lines each connected by a horizontal lower span, a plurality of corresponding pairs of connected upper ends of both lazy tong lines each supporting a horizontal axle spanning therebetween, each axle containing a plurality of wheels or rollers rotatably impaled thereon, said method comprising the steps of:

a. positioning each of the wheels within a wheel-well cutout of an intermittent axle support, with each wheel's axial aperture aligned with that of a cylindrical intermittent axle ensleevement;

b. threading an end of the axle through each aligned intermittent axle support and wheel aperture, and fastening each axle end to the upper end of a respective scissor-pair; and c. threading an end of the lower span through an elongated aperture of a lower portion of said axle support, and fastening each lower span end to the lower end of a respective scissor-pair.

\* \* \* \* \*